Patented June 21, 1949

2,474,032

UNITED STATES PATENT OFFICE 2,474,032

PROCESS FOR REMOVING A FLUORINE COMPOUND FROM A LIQUID HYDROCARBON

Alva C. Byrns, Los Altos, Calif., assignor to The Permanente Metals Corporation, Oakland, Calif., a corporation of Delaware No Drawing. Application August 6, 1945, Serial No. 609,337

4 Claims. (Cl. 196—41)

1

This invention relates to a process for removing fluorine compounds from liquid hydrocarbon materials containing the same.

Among the objects of this invention are to provide a formed magnesium hydroxide treating agent for fluorine-containing hydrocarbons which has strength to permit its use in a column of considerable height, to provide high fluorine assimilation power, to simultaneously provide sufficient porosity in the neutralizing column that the processing rate is suitably rapid, and especially to assure high abrasion resistance of the treating, or neutralizing agent in order to avoid sloughing off of the surface thereof, as well as to provide uniform particle size and shape of the treating agent whereby channeling in the treating column is avoided and more uniform reaction conditions provided.

It is necessary to remove all or essentially all of the fluorine remaining in hydrocarbons which have been subjected to polymerization or alkylation in the presence of catalysts such as hydrogen fluoride, boron trifluoride, alkyl fluorides or the like. The fluorine which is present in the effluent hydrocarbons from the processes mentioned may exist therein in the form of organic compounds, for example, as alkyl or aryl fluorides by combination of the fluorine of the catalyst with the unsaturated hydrocarbons of the starting material, or in some other form. The presence of residual fluorine compound in the hydrocarbon material has been quite undesirable as it causes much corrosion during eventual handling, treatment or use of the hydrocarbon.

A number of methods have been proposed for removing fluorine compounds from hydrocarbon materials, but it has been found, for instance, that washing with alkali fails to effect essentially complete removal, while treatment with alumina exhibits certain other disadvantages. The silica content of natural alumina material, such as bauxite, is undesirably high. Alumina ores which are low in silica are not economically available and purified alumina is expensive. The fluorine-removing capacity of bauxite has proved to be incompletely realized, or rather lower than might be expected, and it is believed that this may be attributed in part to the high silica content, inasmuch as there may be formed with available fluorine $AlF_3 \cdot SiF_4$ which, because of its relatively

2 large molecular volume, brings about rapid sealing off of the bauxite surface. Furthermore, bauxite is an excellent adsorbent for many materials and is not selectively available for reaction with an acid material such as fluorine. Brucite also has been used for neutralizing mineral acids but it is an extremely dense mineral and is practically non-porous, so that it has a lower absorption capacity. Economically available natural brucites also have appreciable silica content (around 4%, usually) and with available fluorine react to form $MgF_2 \cdot SiF_4$, which is an insoluble deposit of relatively large molecular volume, thereby reducing the efficiency of the agent.

According to this invention it has now been found that fluorine can be removed from hydrocarbon materials containing the same by treating such hydrocarbons with a formed magnesium hydroxide obtained by preparing agglomerates of a magnesium oxide-containing composition containing also at least enough water to convert the magnesium oxide content to magnesium hydroxide, and allowing the formed material, or agglomerates, to harden and hydrate.

By the term "magnesium oxide-containing composition" it is intended to include a composition consisting essentially wholly of magnesium oxide, or partly of magnesium oxide and the remainder consisting essentially of magnesium hydroxide. Preferably, magnesia and magnesium hydroxide used in the preparation of the formed material are recovered from seawater by treatment thereof with lime, calcined dolomite or the like to precipitate magnesium hydroxide which is separated off and washed, and which is calcined to magnesia. The hydroxide may be calcined to a light, or caustic, burnt magnesia. In this instance, calcination is preferably carried to a degree of activity indicated by an iodine number of from about 5 to about 25, when determined as described in "Adsorption" by C. L. Mantell, page 346. Magnesia so prepared is admixed with water to form a thick paste, formed, as for example by extruding through a die under suitably high pressure and cutting to desired length and is allowed to hydrate and harden. Alternatively the magnesia, calcined to higher but preferably not to maximum activity, can be mixed with magnesium hydroxide containing sufficient water to hydrate the magnesia, formed, and allowed to hydrate and harden. In another method, dry magnesium hydroxide can be formed by pelleting under very high pressure, or by adding a lubricating amount of water, forming under pressure and allowing to dry. It is preferred not to calcine to maximum activity, as stated, in order that the rate of hydration will be slow enough to permit forming of the material prior to the hydrating step.

The magnesia or magnesium hydroxide obtained from the seawater process as shown above contains few impurities and those in small amounts, which is an advantage in that the formed product has a high neutralizing power. Magnesia from any other source is also useful, as for example, MgO recovered from magnesite, or from dolomite, or from other forms of magnesium carbonate, etc. MgO produced in such manner as to yield a product containing undesirable amounts of silica is preferably treated to remove excess silica, as by grinding and air-separating or by other means, prior to making formed shapes of hydrate therefrom. Preferably, the silica content of the magnesium hydroxide should not be over about 1.5%. Whereas in the past it has been necessary to remove silica or silica compounds from the magnesium hydroxide neutralizing agent used in treating oils after treatment has proceeded for some time, with the magnesium hydroxide shapes of this invention it is an advantage that the low silica content obviates the necessity for such removal operation.

It is an advantage of the coherent formed product made as described herein that the treating or neutralizing agent has great resistance to abrasion and a minimum of fines is produced in use. It is a further advantage that the formed product is so strong that it can be used as packing in a column of considerable effective height, for instance of up to forty feet or even more, without the crushing or deformation which brings about loss of porosity or reduced speed of action.

It is a further advantage of the treating agent of this invention that it exists in uniform particle size and shape, as pellets, balls or the like, and channeling in a packed tower is avoided or minimized. It is also an advantage that, while the product is dense and hard enough to allow of packing a tower of considerable height, it yet has sufficient porosity to provide effectively large surface areas for the neutralizing action and it is not necessary to add non-reactive porous packing material to increase rate of flow. The molecular volume of magnesium fluoride is less than that of magnesium hydroxide and the porosity of the product of this invention, therefore, increases as treatment proceeds and the action of the magnesia hydrate in the pellet or other shape is more completely realizable. The mechanism of the reaction has not been definitely determined but it may be that there is a small amount of fluorine residually present as hydrogen fluoride in the hydrocarbon which has been subjected to treatment in the presence of a fluoride catalyst in the known manner, in which form it reacts readily with the magnesium hydroxide. It is believed more likely that the fluorine is present as an alkyl or aryl fluoride, which either reacts quite readily with magnesium hydroxide, leaving the fluorine in the solid mass in combination with magnesium, the hydrocarbon fluoride being here considered as associated hydrocarbon and hydrogen fluoride, or the decomposition of the organic fluoride may be promoted by small amounts of unhydrated MgO left in the formed reactive material and the HF arising thereby then reacts with the magnesium hydroxide. Whatever the course of the reaction, it has been found in practice that this treatment agent removes substantially all of the fluorine.

The liquid to be treated may be impelled upwardly through a column of the formed agent or it may be allowed to percolate downwardly through such column. In either method the magnesium hydroxide reacts with the fluorine compound to form a magnesium fluoride in solid state. In case any MgO remains in the treating agent in unhydrated form it will also react to give magnesium fluoride. Besides removing fluorine, the formed shapes of this invention also act to neutralize mineral acid present in hydrocarbon liquids, but this material is especially useful in removing fluorine as described.

Instead of pelleting, briquetting or extruding to form the agent into shapes, or agglomerates, of suitable size and conformation, it may be nodulized or agglomerated in other ways. However, it is preferable to agglomerate under pressure. A suitable method of making the formed shapes is described in co-pending application of Woodward, Serial No. 557,047, filed October 3, 1944, but without, of course, the introduction of silica as shown therein. It is an advantage of the formed treatment agent of this invention that it contains no silica, or such small amounts thereof, that there is no effective production in the reaction zone of silicon fluoride, or of other silica reaction products.

It is to be understood that the term "a liquid hydrocarbon" as used in the specification and claims is intended to include any hydrocarbon which is liquid under the conditions of treatment or any liquid mixture of hydrocarbons. Treatment may be carried out at room temperature or at increased or lower temperatures.

It is to be understood that the above description has been given for purposes of illustration only and that modifications and variations may be made therein without departing from the spirit and scope of this invention.

What is claimed is:

1. Process for removing a fluorine compound from a liquid hydrocarbon containing the same which comprises passing said liquid through a bed of magnesium hydroxide aggregate obtained by forming agglomerates of uniform size and shape from a magnesium oxide-containing mixture substantially free from silica with an amount of water sufficient to hydrate said magnesium oxide, and allowing said agglomerates to hydrate and harden.

2. Process for removing a fluorine compound from a liquid hydrocarbon containing the same which comprises flowing said hydrocarbon through a vertical column of shaped magnesium hydroxide prepared by pelleting an admixture of magnesium hydroxide sludge substantially free of silica with light burnt magnesia substantially free of silica, and allowing said pelleted admixture to hydrate substantially to magnesium hydroxide.

3. Process for removing a fluorine compound from a liquid hydrocarbon containing the same which comprises flowing said hydrocarbon upwardly through a vertical column of shaped magnesium hydroxide prepared by calcining magnesium hydroxide recovered from seawater to an iodine number of from about 5 to about 25, admixing water therewith, pelleting said admixture under pressure, and allowing said pelleted material to hydrate substantially to magnesium hydroxide.

4. Process for removing a fluorine compound from a liquid hydrocarbon containing the same which comprises flowing said hydrocarbon through a bed of strong, substantially non-abrading agglomerates of uniform size and shape of magnesium hydroxide, said agglomerates containing not more than about 1.5% silica.

ALVA C. BYRNS.

REFERENCES CITED

The following references are of record in the file of this patent:

UNITED STATES PATENTS

| Number | Name | Date |
| --- | --- | --- |
| 1,821,195 | Woodhouse | Sept. 1, 1931 |
| 2,034,712 | Dolbear | Mar. 24, 1936 |
| 2,205,411 | Howard | June 25, 1940 |
| 2,219,726 | Seaton | Oct. 29, 1940 |
| 2,234,367 | Chesny | Mar. 11, 1941 |
| 2,328,707 | Clar et al. | Sept. 7, 1943 |
| 2,341,567 | Moriarty | Feb. 15, 1944 |
| 2,357,987 | Winding | Sept. 12, 1944 |
| 2,377,546 | Frey | June 5, 1945 |
| 2,412,726 | Frey | Dec. 17, 1946 |
| 2,413,868 | Frey | Jan. 7, 1947 |
| 2,414,259 | Holm | Jan. 14, 1947 |